2,998,314
COLOR PHOTOGRAPHY

Walter Püschel, Dusseldorf, Germany, assignor to Agfa Aktiengesellschaft, Leverkusen, Germany, a corporation of Germany
No Drawing. Filed Sept. 4, 1957, Ser. No. 681,893
Claims priority, application Germany Sept. 18, 1956
13 Claims. (Cl. 96—55)

This invention relates to color photography and particularly to a process for securing improved color reproduction in color photographic materials by means of couplers which produce a colorless coupling product by reaction with the oxidation product of a developing agent for color-forming development.

In the production of colored pictures by color-forming development of exposed silver halide emulsion layers, a color image is formed, as well as the silver image, by a reaction with the oxidation products of the developer when color couplers are simultaneously present. Compounds with activated methylene groups are inter alia used for producing yellow and magenta-colored images.

It has now been found that the compounds with activated methylene groups couple with the oxidation products of the developer, not to form colored reaction products, but instead to form colorless reaction products, if one hydrogen atom in the activated methylene group of these compounds is replaced by a substituted or unsubstituted aliphatic, cyclo-aliphatic, aromatic or mixed aromatic-aliphatic radical. The use of such compounds in conjunction with conventional color couplers makes possible a substantial improvement in the color reproduction in color photography, especially in multi-layer materials for multi-color photography.

Suitable couplers are for instance compounds having the following general formulae:

(1)    

wherein A and B are negative groups such as —$COR_1$, —$COOR_1$, —$CO.COOR_1$, —$CO.NHR_1$, —$CO.NR_1R_1$, —CN; X and $R_1$ stand for a substituted or unsubstituted alkyl group, such as methyl, ethyl, propyl, isopropyl, allyl, butyl, dodecyl, octadecyl, aryl group, such as phenyl, chlorophenyl, tolyl, a cyclohexyl group, such as cycopentyl, cyclohexyl, methylcyclohexyl, an aralkyl group, such as a benzyl group.

Compounds of this constitution are for instance acyl acetic esters, acyl acetoacetic esters, malonic acid ester, acyl acetonitriles, aroyl acetonitriles, cyanacetophenone, cyanacetic esters which are substituted in the reactive methylene group by a radical X.

(2)    

wherein E represents the atoms necessary to complete a cycloaliphatic structure; D is a negative group such as
—$COOR_1$, —$CO.COOR_1$
—$CO.NH.R_1$, —$CO.CO.NH.R_1$ R is an alkyl, cycloalkyl, aralkyl or aryl group (compare Formula 1).

(3)    

wherein F represents the atoms necessary to complete a heterocyclic ring having adjacent to the CO group a reactive group which is capable to react with the oxidation product of a primary aromatic amino developer to form a dyestuff, preferably a pyrazolone-(5) ring, X has the same meaning as above and may also be part of a cycloalkylene ring which is condensed in 3,4 position to the pyrazolone ring.

Examples of such compounds are α-methyl acetoacetic acid ethyl ester, α-methylacetoacetic acid anilide, α-cyanopropiophenone, 3-methyl-1,4-diphenyl pyrazolone, 3-amino - 4 - methyl - 1 - phenyl - pyrazolone(5), cyclopentanone-2-carboxylic acid anilide, cyclopentanone-2-oxalylic acid ethyl ester, cyclohexanone-2-oxalylic acid anilide.

The improvement in color obtained differs according to the way in which these compounds are used. These compounds can with advantage be used in all cases where it seems desirable to take up undesirable oxidation products of the color developer. Thus the compounds can be incorporated in a diffusion-resisting manner into separating layers in multi-layer color materials and thereby contribute to better color separation, since the migration of oxidized color developer from one image layer to another image layer is prevented. Furthermore the compounds can be incorporated in emulsion layers which comprise in admixture at least two types of emulsions which are sensitive for different regions of the visible spectrum and which contain different color couplers for the color forming development. In this case the compounds may be added to the silver halide emulsions which are used for the production of said layers or they may be incorporated in solutions of gelatins or other binding agents, which are mixed with said emulsions, whereafter the mixtures obtained are used for the production of a single layer.

When incorporated in the form of diffusion-resisting compounds in silver halide emulsion layers which contain color couplers, the compounds serve to control the gradation of the silver halide layer; they can moreover be introduced, in the form of compounds without diffusion-resisting properties, into photographic baths, for example into color developers or into bleaching baths, or can be used in aqueous solution for washing developed color photographic layer before the bleaching for preventing color fogging.

The compounds are preferably applied in amounts of 1–20 g. per litre of silver halide emulsion or per litre of coating solution for separating layers. When added to developing solutions, bleaching or bleaching and fixing baths or to the wash-water, amounts of 0.1–20 g. per litre of solution have been found particularly suitable.

The compounds of the present invention may also be incorporated in a water permeable, water insoluble solvent as described for instance in U.S. patent specifications 2,304,940 and 2,322,027.

The corresponding pyrazolones substituted in the 4-position have proved to be particularly suitable.

The benzoyl and acetoacetic esters concerned are produced in a manner analogous to the instructions given in Can. J. Chem. 31, 1025 (1953). The corresponding pyrazolones can be synthesized in a generally known manner by condensation of the corresponding α-substituted benzoyl and acetoacetic esters with phenyl hydrazines.

The way in which these compounds having a colorless coupling action are effective will now be more fully explained by reference to the following examples:

Example 1

An exposed silver halide emulsion layer is developed in a color developer having the following composition:

| | |
|---|---|
| 4-aminodiethyl aniline sulphate | g 2,5 |
| Anhydrous potassium carbonate | g 70.0 |
| Potassium bromide | g 2.0 |
| Anhydrous sodium sulphite | g 2.0 |
| ω-Cyanacetophenone | g 1.0 |
| Water | litre 1 |

After fixing of the silver halide and bleaching out of the silver of the developed image, a magenta-colored residual image is obtained.

If the ω-cyanacetophenone in a developer of the above composition is replaced by α-cyanpropiophenone, a colorless residual image is obtained instead of the magenta image.

α-Cyanpropiophenone is described in J. prakt. Chem. 2, 39 (190).

Example 2

In a manner corresponding to Example 1, the compounds (I)   3-methyl-1-phenyl pyrazolone-(5)
(II)  3-methyl-1,4-diphenyl pyrazolone-(5)

are used in the developer. Whereas a magenta colored image is obtained with (I), the image of (II) is colorless after the silver has been bleached out. The substance II is described in Ber. 31, 3164.

Example 3

Separation layers are arranged between the silver halide emulsion layers in a multi layer material, the separation layers being produced from solutions of the following composition:

| | |
|---|---|
| 3 - stearyl - 4 - methyl - 1 - (3 - sulphophenyl) - pyrazolone-(5) | g 2.0 |
| Gelatine | g 2.5 |
| Water | litre 1 |

The multilayer material may comprise in superimposed relationship a blue sensitive top layer containing as a yellow color coupler 3-[p-stearoylaminobenzoylacetamido]isophthalic acid, a green sensitive layer containing as a magenta color coupler 1-(4'-phenoxy-3'-sulfophenyl)-3-heptadecyl-5-pyrazolone and a red sensitive layer containing as a cyan coupler 1-hydroxy-2-naphthoyl-N-octadecylamido-4-sulfonic acid, a yellow filter layer being arranged between the blue and green sensitive layer.

As compared with a material having separation layers consisting only of gelatine, such a material gives clearly better color reproduction after exposing and processing, particularly of the red and blue tones.

For processing there is used a developing solution of the following composition:

| | G. |
|---|---|
| p-Diethylamino-aniline hydrochloride | 2.75 |
| Hydroxylamino hydrochloride | 1.2 |
| Sodium sulfite (anhydrous) | 2.0 |
| Sodium carbonate (monohydrate) | 66.0 |
| Potassium bromide | 2.5 |
| Water to make 1000 cc. | |

For bleaching and fixing there are used the ordinary baths containing potassium ferricyanide as bleaching agent and sodium thiosulfate as fixing agent.

The compound indicated above was prepared as follows:

α-*Methyl-stearoyl acetic ester.*—A solution of 5.5 g. of sodium in 90 cc. of absolute ethanol is boiled for one hour with 90 g. of stearoyl acetic acidethyl ester. 40 g. of methyl iodide are then added dropwise and the mixture is boiled for 2 hours under reflux. After the resulting mixture has been cooled, 500 cc. of water are poured thereon, the resulting oily layer is taken up in ether, this ethereal extract is dried with sodium sulphate and the ether is distilled off. The residue (about 90 g.) is converted in the following manner into the pyrazolone:

62 g. of 3-sulphophenyl hydrazine are dissolved in 250 cc. of water with the addition of 40 g. of anhydrous sodium acetate. 88 g. of α-methyl stearoyl acetic acid ethyl ester in 600 cc. of n-propanol are added and the mixture is boiled for 2 hours. After the mixture has been cooled, the pyrazolone is precipitated by adding 100 cc. of concentrated hydrochloric acid and is filtered with suction. By repeated boiling with 500 cc. portions of methanol, the pyrazolone is obtained in a pure form readily soluble in alkaline aqueous solution. Yield=90 g.

Example 4

The emulsion layers of a multi-layer material as it is for instance disclosed in Example 3 are separated one from another by using separation layers which are produced from a solution of the following composition:

| | |
|---|---|
| 3 - methyl - 4 - phenyl - 1 - (3' - octadecylene succinamino-phenyl)-pyrazolone-(5) | g 4.0 |
| Gelatine | g 2.5 |
| Water | litre 1 |

By comparison with a material having separation layers consisting only of gelatine, such a material gives clearly better color reproduction, particularly of the red and blue tones. The aforementioned compound was prepared as follows:

61 g. of α-phenyl acetoacetic acid ethyl ester (prepared according to Org. Syntheses, collective volume II, pages 487 and 284), and 46 g. of 3-nitrophenyl hydrazine are heated for 30 minutes in 250 cc. of ethyl acetate to the boiling point. The pyrazolone precipitates after cooling and is filtered off with suction. M.P. 225–227° C. Yield=75 g.

70 g. of this 3-methyl-4-phenyl-1-(3-nitrophenyl)-pyrazolone-(5) are dissolved in 400 cc. of tetrahydrofurane and reduced with hydrogen in the presence of Raney nickel. The syrupy residue remaining after the solvent has been distilled off is immediately further processed as follows:

66 g. of the 3-methyl-4-phenyl-1-(3-aminophenyl)-pyrazolone-(5) are dissolved in 300 cc. of pyridine. 120 cc. of glacial acetic acid are added while cooling. 88 g. of octadecylene succinic acid anhydride are added to this solution and heated for 30 minutes at 60° C. After cooling the substance is poured on to 500 g. of ice and 100 cc. of concentrated hydrochloric acid. The precipitate is dissolved in dilute sodium hydroxide solution and reprecipitated 2 or 3 times from this solution with hydrochloric acid; the product is dried in vacuo at 60° C. Yield=120 g.

Example 5

The emulsion layers of a multi-layer color photographic material, as it is for instance disclosed in Example 3 are separated from one another by using separation layers produced from a solution of the following composition:

| | |
|---|---|
| 3-stearyl-4 ethyl-1-(2'-chloro-4'-sulphophenyl)-pyrazolone-(5) | g 3.0 |
| Gelatine | g 2.5 |
| Water | litre 1 |

The above compound is prepared analogously to the compound the production of which was described in Example 3, while using instead of methyl iodide the equivalent amount of ethyliodide and instead of 3-sulphophenyl hydrazine the equipvalent amount of 2-chloro-4-sulfophenylhydrazine.

Example 6

An exposed multi-layer color photographic material, containing color couplers in the three superimposed silver halide emulsion layers such as an "Agfacolor" positive film is developed in a developer of the following composition:

| | |
|---|---|
| 3,4-dimethyl-1-(4'-sulphophenyl)-pyrazolone-(5) _g__ | 3.0 |
| 4-aminodiethyl aniline sulphate_____g__ | 2.0 |
| Anhydrous potassium carbonate_____g__ | 70.0 |
| Potassium bromide_____g__ | 2.0 |
| Anhydrous sodium sulphite_____g__ | 2.0 |
| Water _____litre__ | 1 |

The cyan fog obtained with this film was 0.09 and the gamma was 1.8 when the film was developed with the aforementioned solution, whereas the values were 0.17 and 2.5 respectively when the film was developed in the same solution, but without addition of the pyrazolone derivative.

The above pyrazolone was produced in the following manner:

42 g. of p-sulphophenyl hydrazine, 20 g. of sodium acetate (anhydrous) were dissolved in 160 cc. of water at 50° C. To this solution there is added a solution of 30 g. of α-methylacetoacetic acid ethyl ester in 500 cc. of methanol. After refluxing for 2 hours the methanol is distilled off, the residue is acidified with 2 cc. HCl and sucked off. Melting point: the compound decomposes at 330° C.

The following two compounds give similar results when used in the same way:

Example 7

3-phenyl-4-methyl-1-(4'-sulphophenyl)pyrazolone-(5).—The compound is prepared according to Example 6, while the α-methylacetoacetic acid ethyl ester is substituted by 41 g. of α-methylbenzoylacetic acid ester. Melting point: the compound decomposes at 336° C.

Example 8

3-methyl-4-phenyl-1-(4-sulphophenyl)-pyrazolone-(5).—The compound is prepared according to Example 6, while the α-methylacetoacetic acid ester is substituted by 41 g. of α-phenylacetoacetic acid ester. Melting point: the compound decomposes at 332° C.

Example 9

An exposed and developed "Agfacolor" positive film is bleached in a bleaching bath of the following composition:

| | |
|---|---|
| Potassium ferricyanide_____g__ | 100 |
| 3,4-dimethyl-1-(4'-sulphophenyl)-pyrazolone-(5) _g__ | 5 |
| Water _____litre__ | 1 |

The cyan fog of this film after bleaching in this bleaching bath is 0.10, whereas the fog when the bleaching is carried out without the addition of the pyrazolone rises to the value of 0.17.

Example 10

An exposed and developed "Agfacolor" positive film is washed for 5 minutes in a bath of the following composition prior to bleaching and fixing:

| | |
|---|---|
| 3-methyl-4-ethyl-1-(sulphophenyl)-pyrazolone-(5) g__ | 5.0 |
| Water _____litre__ | 1 |

This solution is brought to a pH value of 7 by means of 10% sodium carbonate solution. The cyan fog was 0.08 with the intermediate bath, whereas it rose to 0.16 without the intermediate bath.

The compound is prepared according to Example 6, while the α-methylacetoacetic acid ester is substituted by 32 g. of α-ethylacetoacetic acid ester. Melting point: the compound decomposes at 323° C.

Example 11

In a corresponding manner to Example 1, the compounds (I)           Acetoacetic acid anilide (II)   Cyclohexanone (1)-carboxylic acid-(2)-anilide
             (Journ. Chem. Soc. 1929, 1986)

are used in the developer. Whereas a colored residual image is obtained with (I), the residual image obtained with (II) is colorless after the silver has been bleached out.

Example 12

In a manner corresponding to Example 1, the compounds (I)         3-amino-1-phenyl pyrazolone (II)    3-amino-4-methyl-1-phenyl pyrazolone are used in the developer. Whereas a colored residual image is obtained with (I), the residual image obtained with (II) is colorless after the silver has been bleached out.

The 3-amino-4-methyl-1-phenyl pyrazolone (M.P. 146°) is formed if the cyanoacetic ester referred to in the instructions given in Org. Syntheses, vol. 28, page 87, is replaced by the equivalent quantity of α-cyan-propionic acid ester. The α-cyano-propionic acid ester (B.P. 85–89° C./16 mm.) is formed when the chloracetic acid referred to in the instructions given in Org. Syntheses, collective volume 1, page 249, is replaced by α-bromo-propionic acid.

Example 13

According to Example 3 there is embedded in the intermediate layer of a multi-layer material 3-heptadecyl-4-isopropyl-1-(4'-sulphophenyl)pyrazolone-(5). The compound results from hydrogenating the 3-heptadecyl-1-(4'-sulphophenyl)-pyrazolone-(5) in an excess of acetone at 50 atm. and 100° C. in the presence of Raney-nickel. Melting point: 330–350° C.

Example 14

According to Example 6 there is added to the developer 3-methyl-1-phenyl-pyrazolone-(5)-isobutyric acid-(4). By this addition the γ-value is lowered from 2.4 to 1.9.

The compound is prepared as follows:

| | |
|---|---|
| 3-methyl-1-phenyl-pyrazolone-(5) _____g__ | 90 |
| Acetoacetic acid ester_____g__ | 130 |
| Methanol _____cc__ | 70 | are reacted with hydrogen (50 atm.) in the presence of Raney-nickel at 110° C. The absorption of hydrogen being completed the reaction mixture is sucked off from the catalyst. The excessive ester and methanol are distilled off in vacuo. Thereafter the residue is saponified with 400 cc. of 10% hydrochloric acid. Then the pH value is adjusted to 6 by means of caustic soda. When the product is left standing for some time it becomes solid, while at the beginning it was oily. After re-crystallising from aqueous methanol, the product has a melting point of 177–179° C.

The following compounds have the some effect as mentioned in Example 14:

Example 15

3-methyl-4-(4'-chlorophenyl)-1-phenyl pyrazolone.— The compound is obtained analogously to the instructions given in Example 4, in that α-phenylacetoacetic acid ester is replaced by an equivalent amount of α-(4'-chlorophenyl)acetoacetic acid ester. Melting point: 244° C. The α-(4'-chlorophenyl)-acetoacetic acid ester required can be prepared analogously to instructions given in Org. Synth., volume II, pages 284 and 487. Boiling point: 5 mm. 140–150° C.

Example 16

*3-methyl-1-phenyl-pyrazolone - (5) - acetic acid-(4).*—
The compound is described in Berichte 17, page 2052.

Example 17

*3-methyl-1-phenyl-pyrazolone - (5) - acetic acid ethyl ester-(4).*—The compound is described in Berichte 17, page 2052.

Example 18

*3-carbethoxy-1-phenyl - 4 - methyl-pyrazolone - (5).*—
The compound is prepared in the following manner:

|  | G. |
|---|---|
| α-Methyloxalicacetic acid ester | 10 |
| Phenylhydrazine | 11 | are boiled in 100 cc. of toluene for 2 hours with a water-separator put on. After cooling the compound precipitates in pure condition. It is sucked off and washed with petroleum ether twice.

Example 19

*1-(3'-nitrophenyl)-4-methyl-pyrazolone - (5) - carbonic acid-(3).*—The compound is prepared in the following manner: 23 g. of 3-nitrophenylhydrazine sulphate are dissolved in 80 cc. of hot water. Thereafter, 15 g. of methyloxalicacetic acid ester dissolved in 300 cc. of methanol are added and boiled for 6 hours. After distilling off 150 cc. of methanol and acidifying with 2 n hydrochloric acid the residue is sucked off. The compound is recrystallized from methanol. Melting point: 202° C.

50 g. of 3-carbethoxy - 4 - methyl-1-(3'-nitrophenyl)-pyrazolone-(5) are boiled in 500 cc. of 3% caustic soda for one hour. The reaction mixture is acidified with 10% acetic acid and the precipitate is sucked off. Melting point: 260° C.

Example 20

*3,4-1'2' - cyclohexenyl-1-phenyl-pyrazolone-(5).*—The compound is prepared in the following manner:

|  | G. |
|---|---|
| Phenylhydrazin | 12 |
| 1-cyclohexanon-2-carbonic acid ethyl ester | 17 | are boiled in 100 cc. toluene for 5 hours with the water-separator. After cooling the compound crystallizes out. Melting point: 181° C.

Example 21

*α-Methylbenzoylacetic acid ester.*—The compound is described in Journ. Chem. Soc. 49, page 156.

Example 22

*α-Methylacetoacetic acid anilide.*—The compound is prepared as follows: 30 g. of α-methylacetoacetic acid ester are heated with 50 cc. of dry xylene in an oilbath to a temperature of 145–150° C. In the course of half an hour there are added 20 cc. of aniline. After heating for a further half hour, 25 cc. of a mixture of xylene and alcohol are distilled off during one hour, whereafter the reaction mixture is cooled to room-temperature. At the beginning of the crystallization 25 cc. of petroleum ether are added and the crystals formed are sucked off. Melting point: 134° C.

Example 23

5 g. of 3,4-dimethyl-1-benzthiazolylpyrazolone-(5) are dissolved in a developer of the following composition:

| | |
|---|---|
| 1(p-aminophenyl)-3-aminopyrazoline - dihydrochloride (disclosed in German specification 955,026) g | 0.9 |
| Potassium carbonate anhydrous g | 70.0 |
| Potassium bromide g | 2.0 |
| Sodium sulphite anhydrous g | 3.0 |
| Water litre | 1 |

A color multi-layer negative film comprising color couplers for color forming development in the silver halide emulsion layers was developed in this developer for 6 minutes at 18° C. It had an average gamma value of 0.8 while the gamma value without the addition was 1.3.

The compound is prepared as follows:

30 g. of α-methylacetoacetic acid ester
32 g. of benzthiazolylhydrazine are boiled in 240 cc. of xylene for 3 hours with the water-separator. After cooling the compound crystallizes out. It is sucked off and recrystallized from plenty of methanol. Melting point: 225–227° C.

Example 24

7 g. of 3,4-dimethyl-1-phenylpyrazolone-(5) are dissolved in a developer of the following composition:

| | |
|---|---|
| 4 - amino-1-phenylpyrazolone - (5) - carbonic acid amide-(3) (compare DAS 1,002,627) g | 3.0 |
| Potassium carbonate anhydrous g | 70.0 |
| Potassium bromide g | 2.0 |
| Sodium sulphite anhydrous g | 2.0 |
| Water litre | 1 |

A color negative film developed in the above developer for 18 minutes at 18° C. had an average gamma value of 0.8 while the value without addition was 1.2.

The compound is prepared as follows:

60 g. of α-methylacetoacetic acid ester
55 g. of phenylhydrazine are boiled in 600 cc. of xylene for 3 hours with water-separator. After cooling the compound crystallizes out, it can be recrystallized from acetic ester. Melting point: 133–136° C.

In Examples 14–24 the pyrazolones disclosed therein may be replaced by the equivalent amounts of the following compounds:

Example 25

*3-methyl-4-allyl-pyrazolone-(5).*—(Journ. Praktische Chemie (2), 51, 60).

Example 26

*3-acetyl-amino-4-isopropyl-1-phenyl-pyrazolone-(5).* —
The compound is prepared as follows: 50 g. of 3-amino-1-phenylpyrazolone-(5) are reacted in excessive acetone at 100° C. with hydrogen (50 atm.) in the presence of Raney-nickel until the absorption of hydrogen ends. For isolating the product, the reaction mixture is added to 10 times the volume of water. The precipitate is sucked off, and reprecipitated from water/alcohol.

25 g. of the dried hydrogenated product are boiled in 75 cc. of acetic acid anhydride. The cooled mixture is entered into excessive 10% caustic soda solution (temperature not to exceed 25° C.) After the major part of the anhydride has been used, the mixture is again heated to 60–70° C. until complete dissolution has taken place, is cooled again and neutralized with glacial acetic acid. The precipitate is recrystallized from aqueous methanol. Melting point: 150–152° C.

Example 27

*3-methyl-4-benzyl-1-phenyl-pyrazolone-(5).*—The compound is prepared as follows:

42 g. of α-benzylacetoacetic acid ethyl ester
21 g. of phenyl hydrazine
250 cc. of toluene are boiled for 2 hours while distilling off the water formed. After cooling the compound crystallizes. It is recrystallized from methanol. Melting point: 136° C.

Example 28

*3,4-dimethyl-1-(α-pyridyl)-pyrazolone-(5)*.—The compound is produced as follows:

10 g. of α-pyridylhydrazine
14 g. of methyl acetoacetic acid ethyl ester
150 cc. of toluene are boiled for 2 hours while distilling off the water formed. Thereafter the toluene is distilled off in vacuo, the residue triturated with petroleum ether. Melting point: 105–110° C.

Example 29

*3 - phenyl - 4 - methyl - 1 - (2' - ethoxyphenyl)pyrazolone-(5)*.—The compound is produced as follows: 18.6 g. of ethoxy-phenylhydrazinehydrochloride are dissolved in 80 cc. of hot water. A solution of 21 g. of α-methylbenzoylacetoacetic acid ethyl ester in 200 cc. of methanol is added. After refluxing for one hour, the methanol is distilled off. The residue is triturated with 2 n hydrochloric acid and thereafter boiled for a short time in 200 cc. of acetone. Melting point: 168–172° C.

Example 30

*3,4 - dimethyl - pyrazolone - (5) - 1 - tetramethylenesulfon*.—The compound is produced as follows: 17 g. of the addition product of the formula

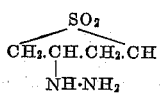

which is obtained by reaction of 1 mol of hydrazinehydrate with 1 mol of butadiene sulfon (reaction product of SO₂ and butadiene), 14 g. of α-methylacetoacetic acid ethyl ester, 150 cc. of toluene are refluxed for 2 hours while distilling off the water formed. After cooling to room temperature the crystals formed are sucked off. M.P. 190–194° C.

Example 31

*3,4-dimethyl-pyrazolone-(5)-carbonic acid-1-amidine*.—The compound is prepared as follows: 26 g. of aminoguanidine-hydrogencarbonate (51%) are suspended in 150 cc. of methanol and then dissolved by dropwise addition of glacial acetic acid. After addition of 14 g. of methylacetoacetic acid ethyl ester the clear solution is heated for 1 hour on the steam bath. The methanol is distilled off, the residue dissolved in 100 cc. of 10% sodium carbonate solution. The crystals formed are recrystallized from water. Melting point: 203–207° C.

Example 32

*4-methyl-3-phenyl-pyrazolone - (5) - carbonic acid - 1-amide*.—(Helv. Chimica Acta, 12, 644).

Example 33

*3,4 - dimethyl - 1 - α - (4' - methylquinolyl)pyrazolone-(5)*.—The compound is produced as follows:

16 g. of α-4-methylquinolyl)-hydrazine
14 g. of α-methylacetoacetic acid ethylester
100 cc. of toluene are refluxed for two hours, while distilling off the water formed. On cooling the compound crystallizes. Melting point: 142–144° C. The above hydrazine is prepared as follows: 12 g. of 2-chlorine-4-methylquinoline and 50 cc. of hydrazinehydrate (95%) are refluxed for 3 hours. After cooling the reaction product crystallizes. Melting point: 147–149° C.

Example 34

*3-ethyl - 1,4 - diphenylpyrazolone - (5)*.—(Berichte 36, 2244).

Example 35

*1-naphthyl - 3 - methyl - 4 - benzyl - pyrazolone - (5)*.—(Berichte 51, 867).

Example 36

*3-phenyl-4-methyl-1(2'-sulphophenyl)-pyrazolone - (5)*.—The compound is produced according to the prescription given in Example 6, while replacing the α-methylacetoacetic acid ethyl ester by 41 g. of methylbenzoyl acid ethyl ester and the 4-sulphophenylhydrazine by 42 g. of 2-sulphophenylhydrazine. Melting point: 303° C.

Example 37

*α-Phenylacetoacetic acid anilide*.—(Annalen 394, 47).

Example 38

*α-Methylbenzoyl acetic acid anilide*.—(Annalen 394, 47).

Example 39

*1-cyclohexanone-2-oxalylic acid anilide*.—The compound is produced as follows: 9 g. of 1-cyclohexanone-2-oxalyl acid ethylester are mixed with 20 cc. of ether and 4.5 cc. of aniline. After 12 hours the ether is distilled off and the residue is triturated with a little methanol.

Example 40

*3 - isopropyl-1,4 - diphenylpyrazolone-(5)*.—(Annalen, 436, 98).

Example 41

*1-cyclohexanone-2-oxalyl acid-(3'-sulphamido) - anilide*.—The compound is prepared as follows: A solution of 9 g. of cyclohexanone-2-oxalyl acid ethylester and 9 g. of 3-aminobenzene-1-sulfonic acid amide in 40 cc. of methanol is refluxed for 2 hours. After distilling off the methanol crystallization sets in after a few days. The crystals obtained are triturated with a little methanol.

Example 42

In the process of Example 4 the pyrazolone is replaced by an equivalent amount of 3,4-dimethyl-1-(3-octadecylene-succinamido phenyl)-pyrazolone-(5).

The compound is prepared as follows: 3,4-dimethyl-1-(3'-nitrophenyl)-pyrazolone-(5)—25 g. of nitrophenylhydrazinsulfate are dissolved in 80 cc. of hot water, 14 g. of α-methylacetoacetic acid ethyl ester are dissolved in 200 cc. of methanol and added to the aforementioned solution. The mixture is refluxed for one hour. On cooling the above compound crystallizes. It is recrystallized from aqueous methanol. Melting point: 230–232° C.

Hydrogenation and reaction with the α-octadecylene succinic anhydride are carried out under the conditions disclosed in Example 4.

Example 43

In the process of Example 4 the pyrazolone is replaced by an equivalent amount of 3-phenyl-4-methyl-1-(3'-octadecylene succinamido-phenyl) pyrazolone-(5). The compound is produced by the process of the preceding example, while replacing the α-methylacetoacetic acid ethylester by the equivalent amount of α-methylbenzoyl acetic acid ethyl ester.

Example 44

In the process of Example 4, the pyrazolone disclosed there is replaced by the equivalent amount of 1-cyclopentanone-2-carbonic acid-(3'-sulfo-4'-methylstearylaminoanilide). This compound is obtained by refluxing a solution of 36 g. of 4-aminomethylstearylaniline-2-sulfonic acid and 25 g. of cyclopentanone-1-carbonic acid-2-ethyl ester in 150 cc. of toluene for 2 hours distilling off the methanol and recrystallizing the residue from methanol.

It will be apparent that the present invention can be used in conjunction with multi-layer color films containing non-diffusing color couplers yielding differently colored dye images. Such color couplers are for instance disclosed in U.S. Patents 2,179,238; 2,186,733; 2,224,329; 2,178,612. Furthermore there may be used multi-layer films containing colored color couplers such as disclosed in U.S. Patents 2,428,054 and 2,449,966. Likewise, mixed grain photographic elements containing such color couplers are suitable in the process of the present invention. These color couplers are added to the silver halide emulsion used for the preparation of photographic elements in amounts of about 2–20 g. per kilogram of emulsion. As color forming developing agents for the processing of these materials there come into consideration the primary aromatic amino developing agents such as p-aminodiethylaniline, 1-p-aminophenyl-3-aminopyrazolines and other agents well known in the art such as 4-amino-1-phenyl pyrazolones.

I claim:

1. In the process of producing color photographic images in exposed silver halide emulsion layers by developing the emulsion with a color forming developer having a primary amino group in the presence of a color coupler having an activated methylene that reacts with the oxidation products of the developer to form a dye, the improvement according to which the development is carried out in the further presence of a supplemental coupler having the activated methylene structure of a color coupler, but in which structure the methylene is substituted with a radical selected from the class consisting of alkyl, cycloalkyl, aryl and aralkyl radicals to cause the supplemental coupler to couple with said oxidation products to form a substantially colorless coupling product and thereby prevent the formation of some of the color, said supplemental coupler being such that without said substitution it would couple with said oxidation products to form a dye.

2. The combination of claim 1 in which the supplemental coupler is a pyrazolone.

3. The combination of claim 1 in which the supplemental coupler is present in the emulsion layer.

4. The combination of claim 1 in which the developing is carried out with a succession of processing baths and the supplemental coupler is present in one of the baths.

5. In a photographic silver halide emulsion for forming a colored photographic image, which emulsion contains a color coupler having an activated methylene that reacts with the oxidation products of a color developer to form a dye, the improvement according to which the emulsion also contains a supplemental coupler having the activated methylene structure of a color coupler, but in which structure the methylene is substituted with a radical selected from the class consisting of alkyl, cycloalkyl, aryl and aralkyl radicals to cause the supplemental coupler to couple with said oxidation products to form a substantially colorless coupling product and thereby prevent the formation of some of the color, said supplemental coupler being such that without said substitution it would couple with said oxidation products to form a dye.

6. A photographic material having a plurality of adherently united superimposed layers at least one of which is a silver halide emulsion containing a color coupler which has an activated methylene that reacts with the oxidation products of a color developer to form a color image when said emulsion is exposed and then developed in such developer, at least one of the layers containing a supplemental coupler having the activated methylene structure of a color coupler, but in which structure the methylene is substituted with a radical selected from the class consisting of alkyl, cycloalkyl, aryl and aralkyl radicals to cause the supplemental coupler to couple with said oxidation products to form a substantially colorless coupling product and thereby prevent the formation of some of the color, said supplemental coupler being such that without said substitution it would couple with said oxidation products to form a dye.

7. In an aqueous alkaline color developer solution containing a primary amine color developer that develops latent images in a silver halide emulsion and thereby forms oxidation products that react with activated methylenes of color couplers to form dyes at the development sites, the improvement according to which the solution also contains a supplemental coupler having the activated methylene structure of a color coupler, but in which structure the methylene is substituted with a radical selected from the class consisting of alkyl, cycloalkyl, aryl and aralkyl radicals to cause the supplemental coupler to couple with said oxidation products to form a substantially colorless coupling product and thereby prevent the formation of some of the color, said supplemental coupler being such that without said substitution it would couple with said oxidation products to form a dye.

8. In an aqueous bleaching bath having a silver image bleaching agent for bleaching out silver images from colored images formed by reaction of the activated methylene of a color coupler with the oxidation products of a primary amine color developer, the improvement according to which the bath also contains a supplemental coupler having the activated methylene structure of a color coupler, but in which structure the methylene is substituted with a radical selected from the class consisting of alkyl, cycloalkyl, aryl and aralkyl radicals to cause the supplemental coupler to couple with said oxidation products to form a substantially colorless coupling product and thereby prevent the formation of some of the color, said supplemental coupler being such that without said substitution it would couple with said oxidation products to form a dye.

9. The combination of claim 1 in which the supplemental coupler is a 4-hydrocarbyl substituted pyrazolone-(5).

10. The combination of claim 5 in which the supplemental coupler is a diffusion-resistant pyrazolone-5.

11. The combination of claim 7 in which the supplemental coupler is a pyrazolone-5.

12. The combination of claim 8 in which the supplemental coupler is a pyrazolone-5.

13. A photographic element having superimposed silver halide emulsion layers sensitive to different regions of the visible spectrum, at least one of said layers containing a color coupler which has an activated methylene that reacts with the oxidation products of a color developer to form a color image when said element is exposed and then developed in such developer, said layers being separated from each other by a hydrophilic layer containing a supplemental coupler having the activated methylene substituted with a radical selected from the class consisting of alkyl, cycloalkyl, aryl and aralkyl radicals to cause the supplemental coupler to couple with said oxidation products to form a substantially colorless coupling product and thereby help confine the above color image to the layer containing the color coupler, said supplemental coupler being such that without said substitution it would couple with said oxidation products to form a dye.

References Cited in the file of this patent

UNITED STATES PATENTS

| | | |
|---|---|---|
| 2,304,987 | Young | Dec. 15, 1942 |
| 2,454,001 | Mueller | Nov. 16, 1948 |
| 2,575,182 | Martin | Nov. 13, 1951 |
| 2,689,793 | Weller et al. | Sept. 21, 1954 |
| 2,728,658 | McCrossen et al. | Dec. 27, 1955 |
| 2,742,832 | Salminen | Apr. 24, 1956 |
| 2,772,161 | Loria et al. | Nov. 27, 1956 |
| 2,865,748 | Feniak et al. | Dec. 23, 1958 |